United States Patent [19]

Jordan

[11] Patent Number: 4,811,514

[45] Date of Patent: Mar. 14, 1989

[54] ICE FISHING RIG

[76] Inventor: William Jordan, Box 415, Pine Falls, Manitoba, Canada, R0E 1M0

[21] Appl. No.: 219,478

[22] Filed: Jul. 15, 1988

[51] Int. Cl.⁴ .............................................. A01K 87/00
[52] U.S. Cl. ........................................... 43/19.2; 43/15
[58] Field of Search ..................................... 43/19.2, 15

[56] References Cited

U.S. PATENT DOCUMENTS

| | | | |
|---|---|---|---|
| 2,709,867 | 6/1955 | Routh | 43/26.1 |
| 3,031,790 | 5/1962 | Duryea | 43/26.1 |
| 3,568,352 | 3/1971 | Hill | 43/26.1 |
| 3,599,369 | 8/1971 | Carlson | 43/17 |
| 4,120,111 | 10/1978 | McBain | 43/19.2 |
| 4,251,939 | 2/1981 | Tiede | 43/19.2 |
| 4,642,930 | 2/1987 | Graf | 43/19.2 |
| 4,680,885 | 7/1987 | Lindell et al. | 43/19.2 |

Primary Examiner—Gene P. Crosby
Attorney, Agent, or Firm—Murray E. Thrift; Stanley G. Ade; Adrian D. Battison

[57] ABSTRACT

A fishing jigger has a main body with two vertical panels mounted on a pair of relatively long, transverse supports, a rod holder extending along the top of the two main panels is pivoted to the panels at one end. An electric operating system for the rod holder includes a crank, a rod mounted on the crank and extending upwardly between two pivoting guides to a cam at the top end of the rod. A cam follower on the bottom of the rod holder is engaged by the cam. When the crank is rotated by an electric motor, the drive linkage produces a slow upward movement of the rod holder and a quick descent. The jigger may be operated by a remote control unit, using power from an automobile battery. The jigger may also include a hook setting feature which is an electrical bypass of the motor speed control to produce a fast upwards movement of the rod holder to set a hook when a nibble or bite is detected.

18 Claims, 4 Drawing Sheets

ICE FISHING RIG

FIELD OF THE INVENTION

The present invention relates to fishing jiggers.

BACKGROUND

Jig fishing or "jigging" is a type of fishing that involves imparting a vertical movement to the bait or lure to attract fish. A device known as a "jigger" is often used for this purpose.

In jigging, the type of motion imparted to a lure or bait is of importance and varies according to the type of fish being sought. It is also important with some types of fish to be able to produce a sharp upward movement on the line to set the hook in response to a nibble on the bait or lure.

The aim of the present invention is to provide a novel and effective jigging apparatus.

SUMMARY

According to the present invention there is provided a fishing jigger comprising:
a rod holder;
means for supporting a fishing rod on the holder in a longitudinal orientation;
pivot means supporting the rod holder for pivotal movement about a transverse pivot access;
an elongate, longitudinally oriented cam follower mounted on the rod holder.
cam means for engaging the cam follower;
cam drive means including a rod connected to the cam, a crank connected to the rod for pivotal movement with respect thereto about a transverse crank axis and a pair of longitudinally spaced guides positioned on opposite sides of the rod between the crank and the cam to limit the longitudinal movement of the rod.

With this linkage, the movement of the rod holder includes a slight delay at the bottom of each stroke, a slow rise and a quick falling action.

In preferred embodiments of the invention, the jigger is driven by an electric motor. The speed of the motor is controlled with a potentiometer and a quick set switch bypasses the potentiometer to provide a rapid upwards movement of the line when a nibble or bite is detected.

BRIEF DESCRIPTION OF THE DRAWINGS

In the accompanying drawings, which illustrate an exemplary embodiment of the present invention.

DETAILED DESCRIPTION

Figure 1:
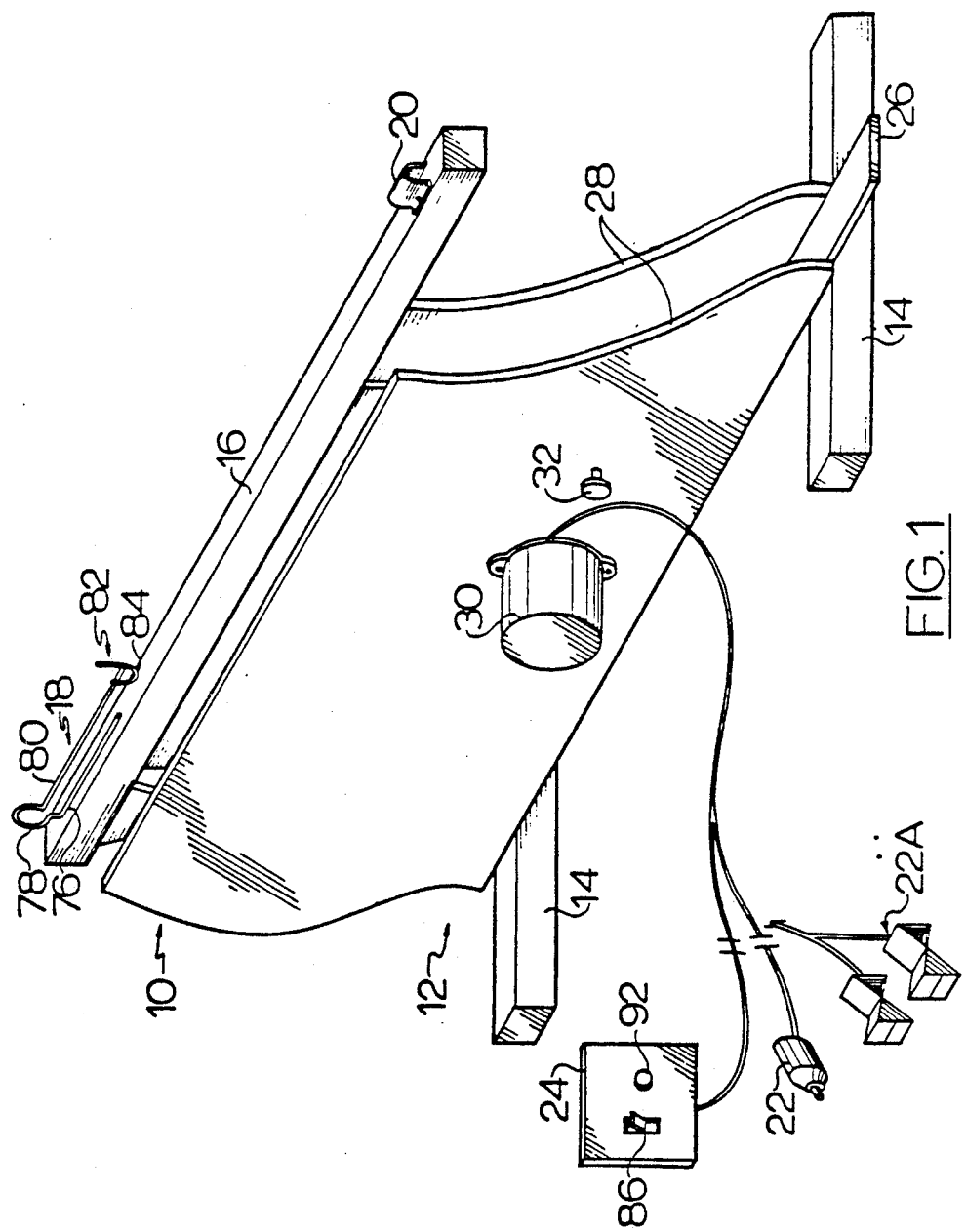
FIG. 1 is an isometric view of a jigger from one side.
Figure 2:
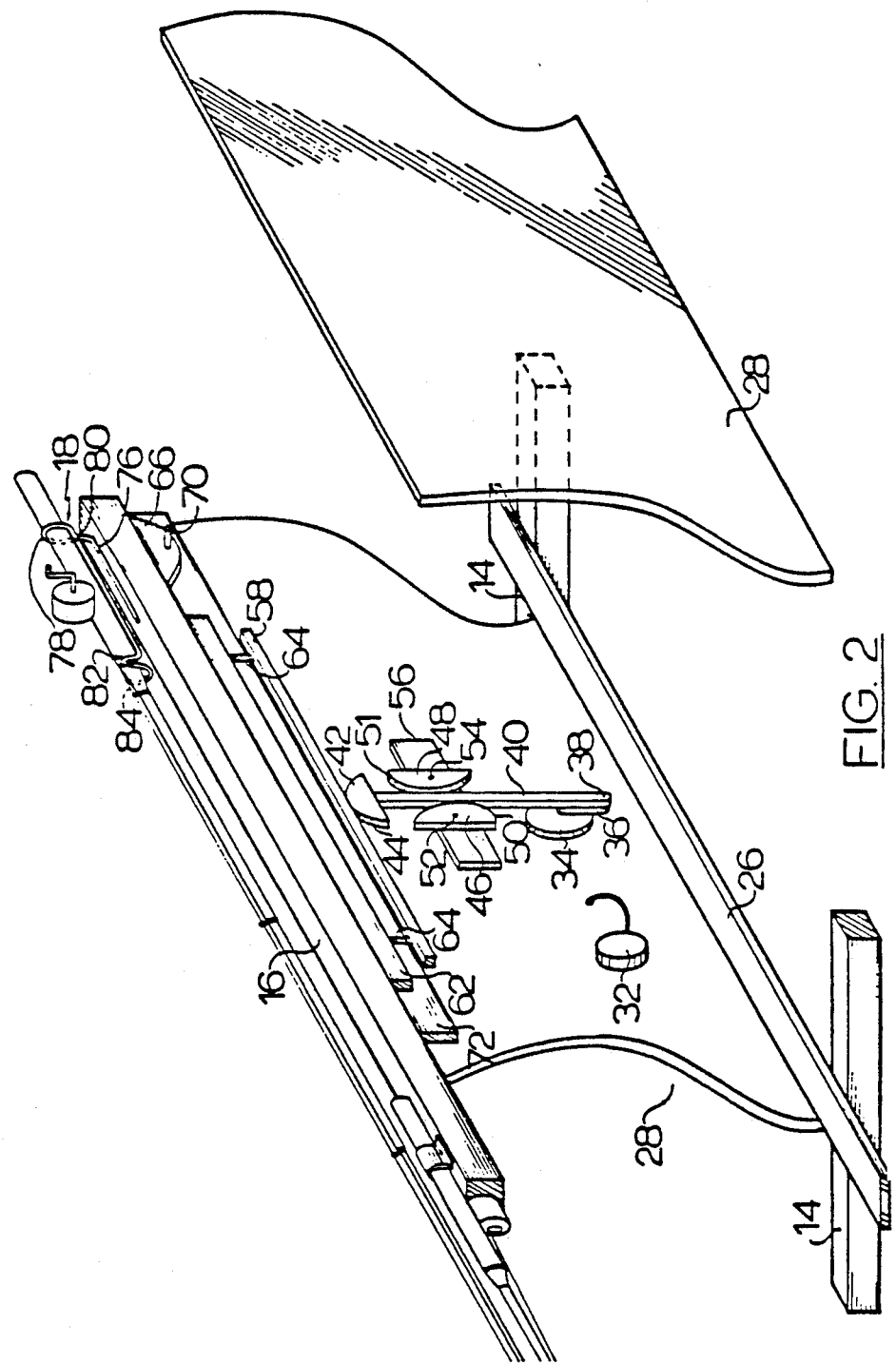
FIG. 2 is an isometric view from the opposite side, with one side panel of the main body shown removed to expose the internal structure.

Referring to the drawings, and especially to FIGS. 1 and 2, there is illustrated a jig 10 with a main body 12 carried on two transverse supports 14 to provide good stability for the jigger on all sorts of terrain, especailly on snow or ice when used for ice fishing. At the top of the main body is an elongate rod holder 16 that has a wire rod support 18 at one end and a strap support 20 for a second rod at the opposite end. The jigger is electrically operated and may be operated from the battery of an automobile using a plug connector 22 to be inserted into the lighter socket of the automobile. Alternative connectors, such as clips 22A may be used for direct connection to a battery. The jigger also includes a hand remote control unit 24.

Referring now to the construction of the jigger in somewhat more detail, the main body 12 includes an elongated, rectangular base plate 26 that carries the two transverse supports 14 and two vertically arranged side panels 28. A DC motor 30 is mounted on the outside of one of the side panels 28. Its speed is controlled by a potentiometer 32 carried on the same side panel. The shaft of the motor 30 passes through the side panel and is connected to a rotor 34 carrying a crank 36. The crank is connected to a transverse pin 38 that is in turn connected to a rod 40. The rod projects upwardly from the crank and carries a cam 42 on its upper end. The cam is an enlarged, flat head on the rod with a semi-circular upper face 44. The rod passes between two guide blocks 46 and 48 that are longitudinally spaced to allow some longitudinal movement of the rod between them. The guide blocks 46 ad 48 have confronting arcuate faces 50 and 51. They are mounted on respective pins 52 and 54 that project from a support 56 carried on the side panel 28.

An elongate cam follower 58 is located immediately above the cam 42. It is connected by a pair of screws 60 to a vertical plate 62 carried on the bottom side of the rod holder 16. The screws 60 fit loosely in bores in the cam follower 58, so that it is capable of vertical movement on the screws. Two coil springs 64 surround the screws 60 to bias the follower 58 away from the plate 62. Adjustment of the screws serves to adjust the force of springs 64.

Adjacent one end, and aligned with the plate 62, the rod holder 16 carries a lug 66 that is pivotally connected to the side panels 28 by transverse pin 70 with its opposite ends carried in longitudinal strip 72 secured to the inside faces of the panels 28. On the top face of each strip 72, near the end furtherest from the pin 70, is a bumper 74 of sponge material to engage the underside of the rod holder 16 when it is in its lowermost position.

As illustrated most particularly in FIGS. 1 and 2, the wire support for a fishing rod consists of a single piece of wire with a straight section 76 secured to the top of the rod holder and curving upwardly into a handle loop 78. From the handle loop, the wire extends forwardly through a straight run 80 generally parallel to the segment 76 and then curves into a transverse S bend 82 which defines a hook 84. The rod is seated in this support with the handle through the handle loop 78 and the rod seated in hook 84. A short rod may be supported in the strap support 20 so that two lines may be jigged simultaneously. In other embodiments, the short line support may be mounted at the opposite end of the rod holder so that lines may be jigged at opposite ends of the jigger.

Figure 3:
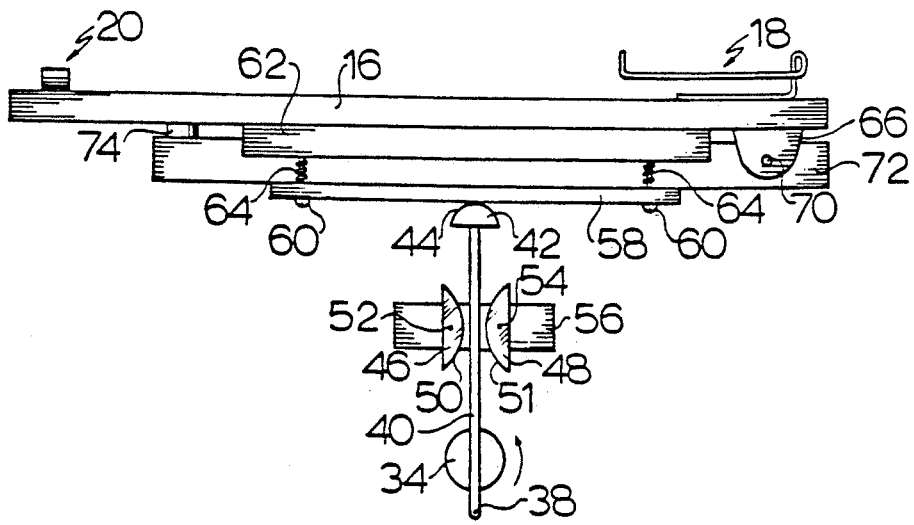
FIGS. 3, 4 and 5 are schematic side elevations of the operating mechanism of the jigger and different stages during the operation.
Figure 4:
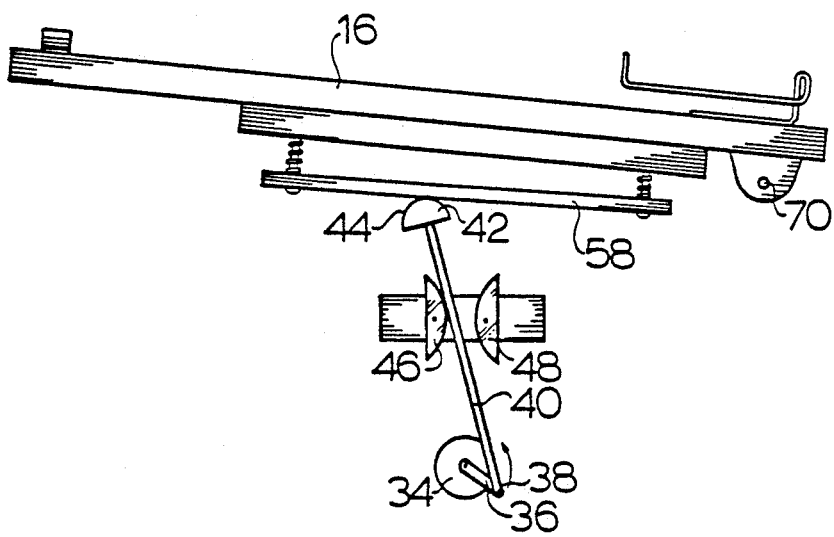
Figure 5:
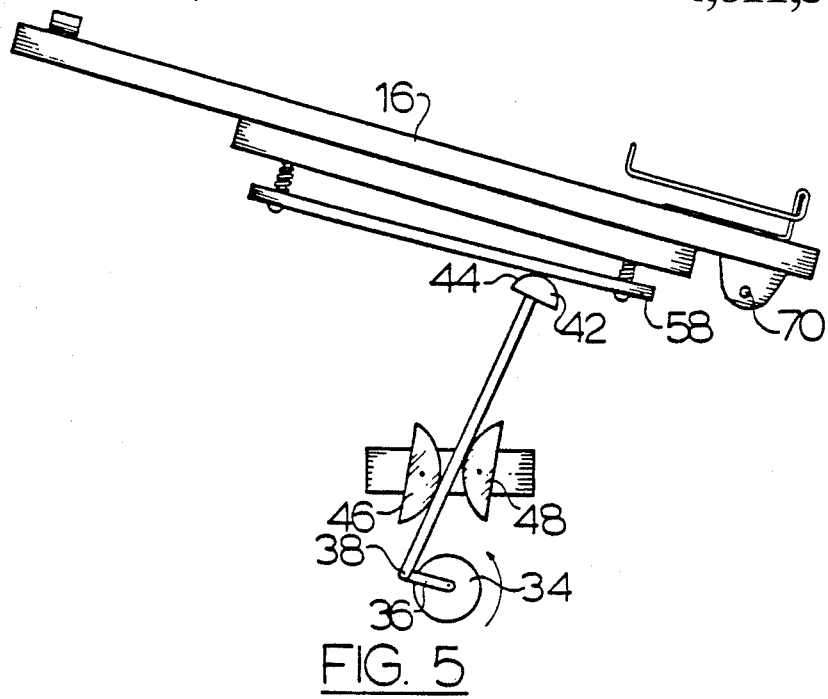

The operation of the jigger is most clearly understood from FIGS. 3, 4, and 5. In FIG. 3, the rod holder 16 is shown in its lowered, horizontal position. The crank 36 is at bottom dead centre and the cam 42 is resting on the bottom of the cam follower 58, approximately at the centre. The rotor 34 is driven counterclockwise as shown by the arrow in FIGS. 3, 4 and 5 to raise the rod 40. As it rises, the rod pivots and comes into contact with the arcuate faces of the guide blocks 46 and 48. The cam 42 slides along the underside of the cam follower 58 in a direction away from the pin 78 on which the rod holder is mounted. This produces a relatively slow rise of the rod holder. As the crank approaches top dead centre, the pivoting movement of the rod is reversed and as the crank passes top dead centre, the cam slides towards the pin 70, thus tending to elevate the rod holder and countering the effect of the rod's descent. As the crank 36 continues to rotate, the rod is lowered and pivots back towards the central position, drawing cam 42 away from the pin 70, so that the descent of the rod holder is much more rapid than its rise.

When the rotor reaches its bottom dead centre position, there is a pause in the motion of the rod holder.

Figure 6:
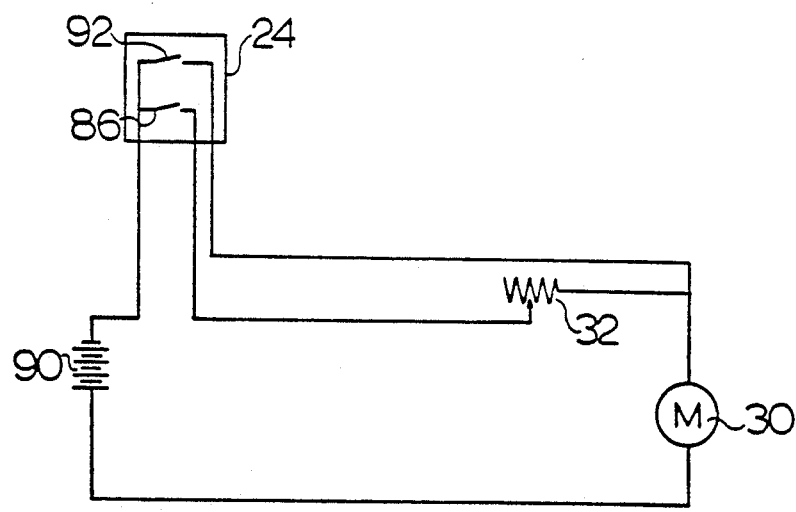
FIG. 6 is a circuit diagram showing the electrical operating circuit for the jigger.

The electric circuit for operating the jigger is illustrated in FIG. 6. The motor 30 is connected through the potentiometer 32 and an on-off switch 86 in the hand held control unit 24 to the battery 90. A quick set switch in the hand held control unit is also connected to the battery and to a line bypassing the potentiometer. To use the quick set feature, the jigger is stopped using the on-off switch at the point where the rod is jsut beginning to rise. When a nibble or bite is detected by movement of the rod tip, the quick set button is depressed and the rod is given a quick firm upward movement, thereby setting the hook.

The jigger described in the foregoing has a number of distinct advantages. The use of an electric motor with a remote control makes jigging a pleasant past-time for people that have difficulties with manual jigging. It also lends itself very well to the pickerel rig style of fishing, particularly in view of the quick set control.

For ice fishing, the remote control enables an operate to sit in an automobile or a truck cab and control the movement of the rod. The jigger may also be used in a boat. The large base and low mounted motor make the unit quite stable and difficult to upset. The wire support for a spinning or casting rod is set back over the hinge point of the rod holder so that the load on the motor and other moving parts is reduced.

While one embodiment of the present invention has been described in the foregoing, it is to be understood that other embodiments are possible within the scope of the present invention. It is therefore to be understood that the invention is to be considered limited solely by the scope of the appended claims.

I claim:

1. A fishing jigger comprising:
    a rod holder;
    means for supporting a fishing rod on the holder in a longitudinal orientation;
    pivot means supporting the rod holder for pivotal movement about a transverse pivot access;
    an elongate, longitudinally oriented cam follower mounted on the rod holder;
    cam means for engaging the cam follower;
    cam drive means including a rod connected to the cam, a crank connected to the rod for pivotal movement with respect thereto about a transverse crank axis and a pair of longitudinally spaced guides positioned on opposite sides of the rod between the crank and the cam to limit movement of the rod laterally of the rod.
2. a jigger according to claim 1 wherein the cam follower is positioned below the rod holder.
3. A jigger according to claim 2 including follower mounting means resiliently mounting the cam follower on the rod holder.
4. A jigger according to claim 3 wherein the follower mounting means are adjustable.
5. A jigger according to claim 3 wherein the follower mounting means comprise threaded fasteners joining the follower and the rod holder and springs positioned between the follower and the rod holder.
6. A jigger according to claim 4 wherein the follower mounting means comprise threaded fasteners joining the follower and the rod holder and springs positioned between the follower and the rod holder.
7. A jigger according to claim 1 wherein the guides comprise a pair of guide blocks with longitudinally spaced, confronting, aruate cam faces between which the rod is positioned.
8. A jigger according to claim 7 wherein the guide blocks are mounted for free pivotal movement about respective transverse axes.
9. A jigger according to claim 1 including a motor for rotating the crank.
10. A jigger according to claim 9 including speed control means for selectively reducing the speed of the motor.
11. A jigger according to claim 10 including hook setting means for bypassing the speed control means so as to cause the motor to operate at a high speed.
12. A jigger according to claim 11 including a hand controller containing a manually operable control for the hook setting means and adapted to be operated at a position remote from the jigger.
13. A jigger according to claim 12 wherein the hand controller includes a motor stopping means.
14. A jigger according to claim 13 wherein the hand controller is connected to the jigger by a wire.
15. A jigger according to claim 12 wherein the hand controller is connected to the jigger by a wire.
16. A jigger according to claim 12 wherein the motor is electrically operated, the speed control is a potentiometer and the hook setting means comprise a switch bypassing the potentiometer.
17. A jigger according to claim 10 wherein the motor is electrically operated, the speed control is a potentiometer and the hook setting means comprise a switch bypassing the potentiometer.
18. A jigger according to claim 11 wherein the motor is electrically operated, the speed control is a potentiometer and the hook setting means comprise a switch bypassing the potentiometer.

* * * * *